United States Patent [19]

Henderson et al.

[11] Patent Number: 5,737,740
[45] Date of Patent: Apr. 7, 1998

[54] APPARATUS AND METHOD FOR PROCESSING ELECTRONIC DOCUMENTS

[75] Inventors: Phillip L. Henderson, Doylestown; David J. Porter, Glenside, both of Pa.

[73] Assignee: Numonics, Montgomeryville, Pa.

[21] Appl. No.: 548,283

[22] Filed: Oct. 25, 1995

Related U.S. Application Data

[63] Continuation-in-part of Ser. No. 266,138, Jun. 27, 1994, abandoned.

[51] Int. Cl.$^6$ .......................... G06F 17/24; G06F 17/21; G06F 03/03; G08C 21/00
[52] U.S. Cl. ............... 707/530; 178/18; 178/19; 345/179; 345/327; 364/400; 707/540; 707/541
[58] Field of Search .................. 178/18, 19; 345/179; 358/452; 364/400; 395/327, 329, 330, 331, 339, 792, 803, 804

[56] References Cited

U.S. PATENT DOCUMENTS

| | | | |
|---|---|---|---|
| Re. 34,476 | 12/1993 | Norwood | 382/186 |
| 3,399,401 | 8/1968 | Ellis et al. | 345/179 |
| 3,851,097 | 11/1974 | Rodgers | 178/19 |
| 4,455,452 | 6/1984 | Schuyler | 178/18 |
| 4,552,991 | 11/1985 | Hulls | 178/19 |
| 4,556,909 | 12/1985 | Yamada | 348/307 |
| 4,570,033 | 2/1986 | Hulls | 178/19 |
| 4,600,807 | 7/1986 | Kable | 178/19 |
| 4,633,436 | 12/1986 | Flurry | 345/179 |
| 4,688,933 | 8/1987 | Lapeyre | 356/1 |
| 4,723,836 | 2/1988 | Kono et al. | 350/331 |
| 4,727,588 | 2/1988 | Fox et al. | 382/13 |
| 4,734,789 | 3/1988 | Smith et al. | 358/300 |
| 4,777,329 | 10/1988 | Mallicoat | 178/18 |
| 4,827,330 | 5/1989 | Walsh et al. | 358/452 |
| 4,827,410 | 5/1989 | Corren | 364/200 |
| 4,841,290 | 6/1989 | Nakano et al. | 340/707 |
| 4,845,684 | 7/1989 | Garwin et al. | 367/137 |
| 4,873,398 | 10/1989 | Hubby, Jr. | 178/18 |
| 4,947,444 | 8/1990 | Nagaoka | 382/204 |
| 4,996,561 | 2/1991 | Yoshimura et al. | 399/107 |
| 5,020,122 | 5/1991 | Walsh et al. | 382/236 |
| 5,027,198 | 6/1991 | Yoshioka | 358/85 |
| 5,051,736 | 9/1991 | Bennett et al. | 340/707 |
| 5,073,770 | 12/1991 | Löwbner | 340/706 |
| 5,153,386 | 10/1992 | Siefer et al. | 178/18 |
| 5,155,813 | 10/1992 | Donoghue et al. | 395/275 |
| 5,159,322 | 10/1992 | Loebner | 340/706 |
| 5,164,585 | 11/1992 | Lieu | 250/221 |
| 5,239,373 | 8/1993 | Tang et al. | 358/93 |
| 5,248,856 | 9/1993 | Mallicoat | 178/18 |
| 5,272,470 | 12/1993 | Zetts | 345/173 |
| 5,274,362 | 12/1993 | Potvin | 345/178 |
| 5,511,148 | 4/1996 | Wellner | 395/106 |
| 5,552,900 | 9/1996 | Someya | 358/452 |
| 5,557,515 | 9/1996 | Abbruzzese et al. | 395/209 |

Primary Examiner—Edward R. Cosimano
Attorney, Agent, or Firm—Paul & Paul

[57] ABSTRACT

A system is disclosed for the processing of electronic documents wherein the hardcopy of an original document is placed on an x-y digitizer. The original document is then written upon with a digitizer pen that marks the original document while at the same time converting the handwritten marking into digital form. The digitized edit is stored as an electronic document that can be printed for general distribution, displayed, edited or the like. The system is useful in such applications as group meetings or presentations, where information is gathered and handwritten on a paper pad or flip chart supported by an easel.

33 Claims, 7 Drawing Sheets

APPARATUS AND METHOD FOR PROCESSING ELECTRONIC DOCUMENTS

CROSS-REFERENCE TO RELATED APPLICATIONS

This application is a continuation-in-part of U.S. application Ser. No. 08/266,138 filed Jun. 27, 1994 which is abandoned and now Ser. No. 08/770,487 filed Dec. 20, 1996.

FIELD OF THE INVENTION

The present invention relates to the storing of documents in electronic form. More particularly, the invention relates to the use of an x-y digitizer to create an electronic version of a document which is stored for later access by a user, such as for copying or editing.

BACKGROUND OF THE INVENTION

With the increasing use of computers and electronic communication equipment, documents are increasingly being stored, transmitted and displayed in electronic form. In many instances, it is desired to convert the original hardcopy of a document into electronic or digital form in order to store, transmit and/or display the document more efficiently. However, once an original document has been converted to digital form, it is often necessary to edit or annotate the digital version of the document. For example, it may be desired to electronically transmit the digital form of a document by telephone or computer network to a remote location where the document is displayed on a computer screen or the like, and then incorporate handwritten notations on the displayed document. As another example, where the original version of a document is to be stored in digital form for archival purposes, it may also be desired to digitally store any handwritten markings made on the original document. As a further example, it may be desired to create a drawing or other document by hand, while at the same time creating and storing a digital version of the document.

One area of increasing interest is teleconferencing systems, which allow multiple groups in remote locations to communicate with each other. The simplest teleconferencing systems use speaker telephones patched together in a conference call, while more elaborate systems use specially equipped rooms with full motion video, high fidelity sound and very high capacity communication links to produce broadcast quality sound and video interconnections among groups in two or more locations. The objective of these systems is to provide a level of communication among remote individuals or groups of people which approaches the level achieved in face-to-face meetings. An essential part of many meetings is the ability to share documents and to interact with the documents in some manner. For example, participants in a face-to-face meeting may underline or circle parts of a document for emphasis, or make corrections or annotations in the margin. In the case of a technical drawing, the participants may sketch in changes or additions. During a teleconference, there is a need for the participants to edit documents in such a manner that allows persons at each remote location to see the annotations.

A second area of increasing interest relates to group meetings or brainstorming sessions, during which ideas and information are presented and developed through interaction by the group. During this type of session it is very common to use a flip chart to record ideas as they are developed by the group. The flip chart normally consists of a large pad of paper mounted on an easel in the front of the room. It normally is large enough so that everyone in the group can see what is written. In addition, the individual pages can be hung on the wall as they are filled, so that all of the items can be seen and referred to as the meeting progresses. Additions or corrections can also be made on any of the pages after they have been torn off the pad and hung on the wall. One of the problems with a flip chart is in making the information which is written on it available to the group in general after the meeting is over. Usually someone is assigned the task of transcribing the data from the flip chart to a text file on a computer so that it can be reproduced and distributed. One solution to this problem is a scanning whiteboard. A scanning arm is added to a white board surface which allows material written on the whiteboard surface to be scanned and then printed. The disadvantage to this solution is that it is slow, does not allow multiple pages to be displayed at once and it is not possible to add to or edit pages that have been erased.

Another area of increasing interest is in the medical field, where X-rays and other graphical images are increasingly being stored in digital form to simplify handling and archiving. However, doctors often prefer to work with the original X-ray rather than with a displayed digital image. It is very common for a doctor to make notes and marks on an X-ray in order to record or explain the doctor's analysis. A need exists to store the doctor's notes and markings in digital form along with the document upon which the markings are made.

Various digitizers are known in the prior art for converting the x-y position of a stylus into digital form. In these digitizers, a stylus simulating a writing instrument is drawn or selectively positioned on the digitizer surface. The device responds to the position of the stylus to generate digitized signals that are typically conveyed to a host computer. Such x-y digitizers are usually activated by electromagnetic coupling between the stylus and the work surface, but can also be activated by electrostatic coupling, touch, optical, and ultrasonic means.

Conventional electromagnetic x-y digitizers are disclosed in U.S. Pat. Nos. 3,851,097, 4,552,991, 4,570,033, 4,600, 807, 4,633,436, 4,727,588, 4,841,290, 5,153,386, 5,155,813 and 5,272,470.

Touch controlled x-y digitizers are disclosed in U.S. Pat. Nos. 4,455,452 and 5,274,362.

Optical x-y digitizers are disclosed in U.S. Pat. Nos. 4,688,933, 5,051,736, 5,073,770, 5,159,322 and 5,164,585.

An ultrasonic x-y digitizer tablet is disclosed in U.S. Pat. No. 4,845,684.

Several conventional x-y digitizers have been used in conjunction with computer display screens, wherein the digitizer is mounted on or behind the screen. When the digitizer is mounted on the display screen, it is provided in the form of a transparent sheet. Such overlapping digitizers and display screens are disclosed in U.S. Pat. Nos. 4,723, 836, 4,827,410, 4,873,398 and Re 34,476.

The use of a transparent x-y digitizer mounted on a computer screen to edit an electronic version of a document displayed on the screen is known in the prior art, as disclosed in U.S. Pat. Nos. 5,027,198 and 5,239,373. In these systems, editing is performed directly on the computer screen rather than on the hardcopy of a document.

The above-noted U.S. patents are incorporated by reference herein.

The present invention has been developed in view of the foregoing, and to overcome other deficiencies of the prior art.

SUMMARY OF THE INVENTION

An object of the present invention is to provide a novel apparatus and method for processing documents.

Another object of the present invention is to provide a system for processing document comprising means for marking on at least one document, means responsive to the marking means for converting the marking provided on the document into electronic form, and means for storing the electronic form of the marking as an electronic version of the document. Means may also be provided for editing the marking on the document.

Another object of the present invention is to provide a method for processing documents comprising the steps of positioning a document on a digitizer, marking the document, digitizing the marking made to the document, and storing the digitized marking made to the document to provide an electronic version of the document in a file. The method may also include the step of editing the document.

In accordance with the present invention, annotations which are made on a document are also provided in electronic form and stored for later use if desired. Any subsequent edits made to the document are also incorporated within the electronic version of the document. The electronic document can be displayed or printed at local and/or remote locations. The present invention is useful in many applications where it is desired to record information provided on a document, including teleconferencing systems where it is desired to interact with a document that is displayed at multiple locations, editing of digitized medical documents or graphical images such as X-rays, creating and editing drawings for engineering and other purposes, and editing digitized documents for archival purposes. A major advantage of the present invention is in applications where hand written notations and the like are made directly on an original document, for example group meetings and other presentations, or brain-storming sessions.

These and other objects of the present invention will become more readily apparent from the following description.

DETAILED DESCRIPTION OF THE PREFERRED EMBODIMENTS

Figure 1:
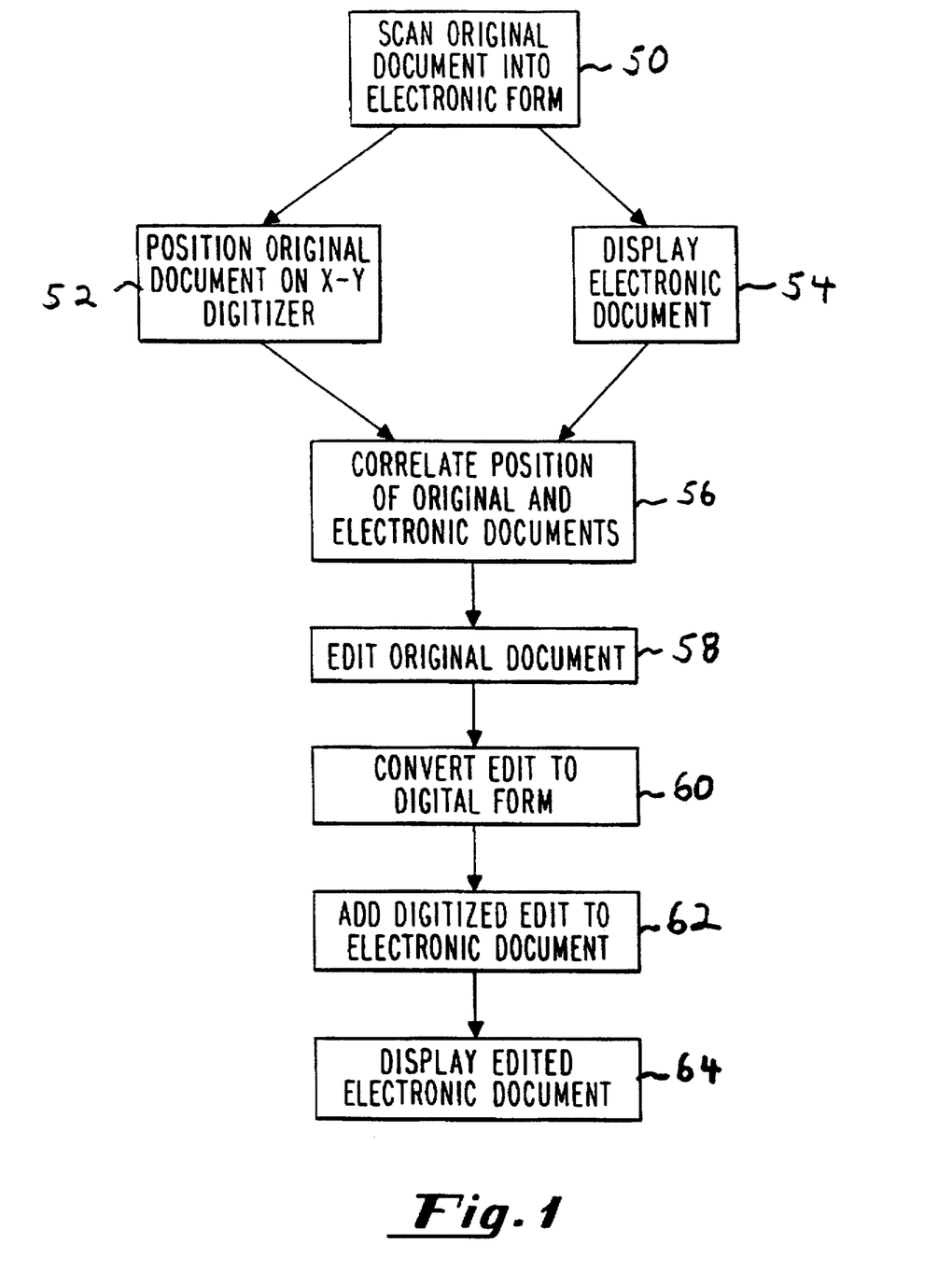
FIG. 1 is a schematic flow diagram illustrating an embodiment of the present invention.

FIG. 1 is a flow diagram in accordance with one embodiment of the present invention. As illustrated in FIG. 1, the original hardcopy of a document is also provided in electronic form at 50. Typically, the original document is scanned into digital form by bit mapping methods or the like. However, the electronic version of the document may be provided by other means. For example, the digital document may be created first, followed by printing of the document to obtain a hardcopy thereof. The original document is then positioned in a fixed location on an x-y digitizer pad at 52. At this stage, an image of the electronic version of the document may optionally be displayed on a computer screen or other suitable display device located adjacent to the x-y digitizer and/or remote from the x-y digitizer at 54. Once the original document is positioned on the digitizer, its position must be correlated with the electronic version of the document at 56. Such correlation ensures that the original and electronic documents correspond in scale, rotation and offset. This correlation may be achieved by various methods, including the identification of corresponding points on the original document and on the displayed image of the electronic document, as more fully described below. Once the scale, rotation and offset of the original and electronic documents are correlated, the original document may be edited while it is secured to the x-y digitizer surface at 58. Editing is performed with a digitizer pen that, in conjunction with the digitizer surface, converts the handwritten edit into digital form at 60. The digitized edit is then combined with the electronic version of the original document to produce an edited electronic document at 62. This edited electronic document may then be displayed by means of a computer display screen or the like at local and/or remote locations at 64.

By enabling the operator to mark directly on the hardcopy original document, the present invention provides an electronic editing system that more closely simulates the conventional editing of paper documents without the necessity of positioning a cursor on a computer screen as required in many prior art electronic editing systems.

The terms "original" and "hardcopy" are used broadly in accordance with the present invention to include various types of physical documents comprising paper, film, transparencies and the like. The documents may contain text, drawings and other graphical images. Examples of original or hardcopy documents include, but are not limited to, printed and/or handwritten text on paper, printed and/or handwritten drawings on paper, blueprints, X-ray films, photographic slides and transparencies.

The term "edit" is used broadly in accordance with the present invention to include various types of annotations, changes, additions, markings, sketches and the like made to a document. A document may thus be edited by adding, changing and/or removing material previously contained in the document. In addition, a document may be edited by adding text, drawings and/or other graphical images to an otherwise blank document.

The apparatus of the present invention comprises an x-y digitizer adapted for positioning a document thereon, a digitizer pen used in conjunction with the digitizer to edit a document mounted on the digitizer and, preferably, at least one display screen for displaying the electronic version of an edited document. In addition, the apparatus may include a scanner for initially converting an original document into electronic or digital form.

The x-y digitizer of the present invention may be of any suitable type such as electromagnetic, electrostatic, touch, optical, ultrasonic and the like, with electromagnetically actuated digitizers being preferred. For most applications, a digitizer having an opaque surface is suitable. However, in some applications such as editing of X-rays or photographic transparencies, a translucent, back-lit x-y digitizer may be used. The size of the digitizer surface may vary depending upon the size of the documents to be edited. The surface of the digitizer is preferably at least 8½×11 inches to accommodate standard sheets of paper. Where larger documents such as engineering drawings are to be edited, a larger digitizer surface may be provided. In a preferred embodiment, the surface of the digitizer is larger than the size of the documents to be edited in order to provide a border area that can be used to initiate various control commands when using software such as WINDOWS™ and the like. A particularly preferred digitizer pad is provided by Numonics, Inc. under the tradename GRAPHICMASTER™ digitizer pad. The GRAPHICMASTER™ digitizer pad provides a working area of 12×12 inches which provides ample room for a control area outside an 8.5×11 sheet of paper. It provides ample resolution and accuracy for the editing function and is available with a natural feeling pen-line stylus with a ballpoint pen refill. Its low profile form makes it unobtrusive in a normal office desktop environment.

The digitizer pad is preferably provided with means for securing a document to the pad in a fixed location. Suitable fasteners include mechanical clips such as those used on clip boards, adhesive strips and mechanical stops located at the edges and/or corners of a document.

Various types of digitizer pens may be used with the x-y digitizer of the present invention. A preferred digitizer pen includes a tip switch that actuates when a small amount of pressure is applied to the tip of the pen. The tip switch preferably requires only a small travel distance for actuation. The switch therefore preferably actuates when the digitizer pen is pressed just hard enough to mark on an original document. In this manner, the markings made on an original document can be converted to corresponding electrical signals with an "on" signal indicating that a mark has been made on the document and an "off" signal indicating that no mark has been made.

The digitizer pen may be corded, but is preferably cordless in order to provide easier operation. Multiple digitizer pens may optionally be provided corresponding to different colors, highlighters, erasers, etc., as discussed more fully below. The digitizer pen may be provided with a removable inking insert and an optional non-marking insert that can be used when an original document is not to be marked on.

The term "pen" is used in the broadest sense in accordance with the present invention and includes writing instruments such as ink pens, graphite pencils, wax pencils and the like, as well as non-marking instruments. Suitable digitizer pens also include cursors, fingers, pointers, light emitting pens, ultrasonic emitting pens and any other device that can be used to indicate the x-y coordinate position of the pen in relation to the x-y digitizer. In the preferred embodiment, the digitizer pen is provided in the form of an ink pen for marking the hardcopy of an original document.

The display screen used in accordance with a preferred embodiment of the present invention is preferably a CRT computer screen, but may also include displays such as LCD screens, projection screens and the like. Single or multiple display screens may be provided at local and/or remote locations. Where remote display screens are used, the electronic or digitized version of a document to be displayed may be transmitted to the remote location by conventional means such as by telephone and/or by computer network.

In accordance with a preferred embodiment of the present invention, a scanner is provided for converting the original document into digital form. The scanner preferably operates by conventional bit mapping or raster methods. Various types of scanners are suitable, including facsimile-type scanners, full color scanners and high gray scale resolution scanners. For most documents, facsimile-type scanners are preferred due to their relatively low cost. However, in certain applications, scanners that provide full color and/or high gray scale resolution may be preferred. For example, when digitizing a graphical image such as a medical X-ray, it may be desirable to use a scanner with high gray scale resolution.

Figure 2:
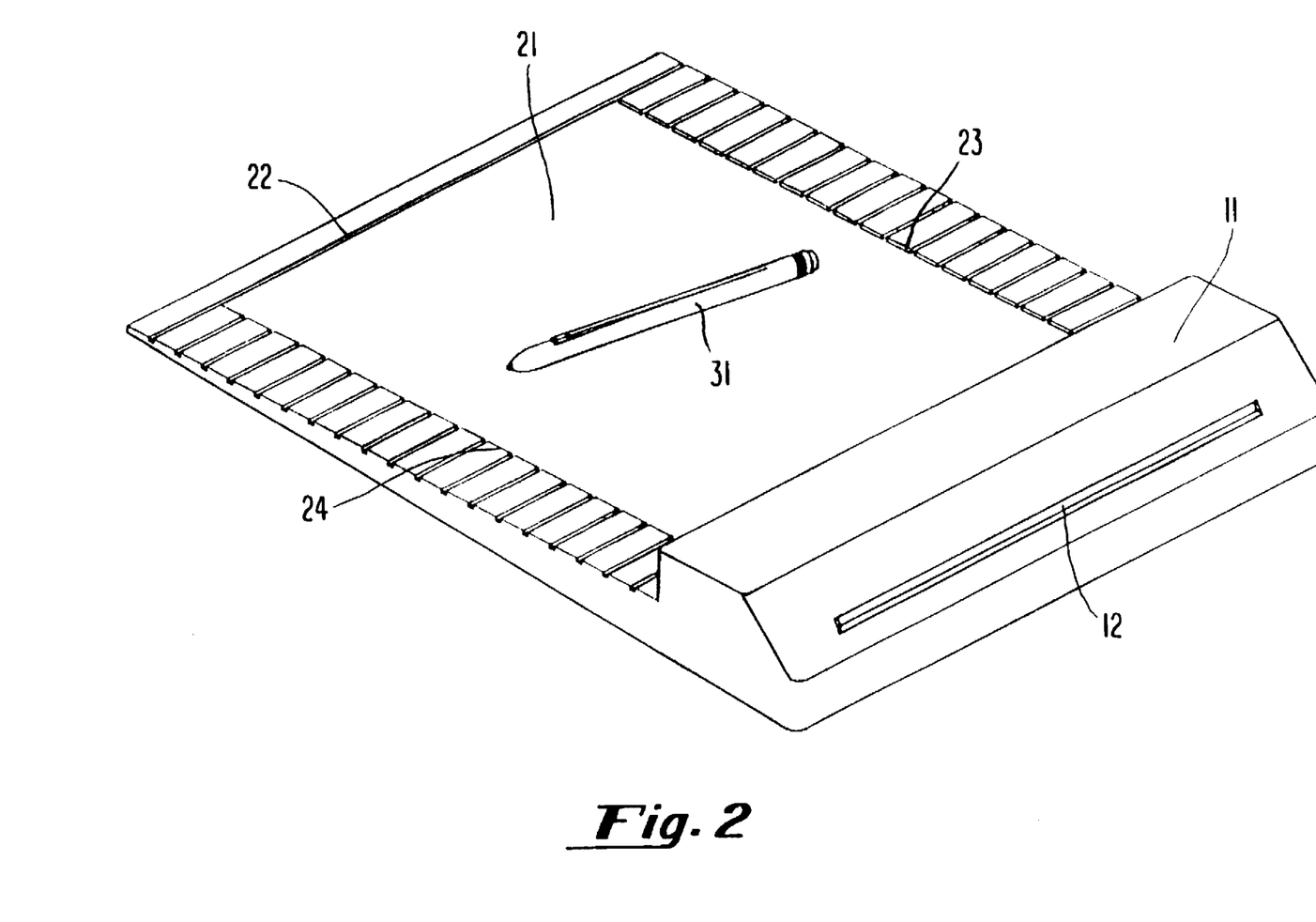
FIG. 2 is an orthogonal view of a combination scanner and x-y digitizer in accordance with an embodiment of the present invention.

A preferred scanner that also incorporates an x-y digitizer pad is shown in FIG. 2. In this embodiment, an original document is fed into the scanner 11 through the scanner input opening 12. The scanner is the sheet fed type which moves the document past a stationary scan head using rollers, as incorporated in many conventional facsimile machines. After passing the scan head, the document exits the scanner 11 and is deposited on the digitizer surface 21. The document may be placed in a known position on the digitizer surface 21 by positioning the document against mechanical stops 22, 23 and 24 along the edges and/or at the corners of the document. The mechanical stops 22, 23 and 24 may thus be used to position the document in a known rotational orientation and position on the x-y digitizer surface 21. Alternatively, an optical sensing system (not shown) may be built into the surface of the digitizer to locate the edges of the document. Thus, a document may be placed in a known position on the digitizer surface 21 in order for annotations made on the document to be properly located on the corresponding electronic version of the document, as more fully described below. The digitizer pen 31 may be used to edit the original document and to provide corresponding annotations on the electronic version of the document.

In an alternative embodiment, a line scanner may be used, wherein the original document is placed on an x-y digitizer pad and a moveable digitizing scanner is passed over the stationary document. Such a moveable scanner may be slidably mounted to the edges of the digitizer pad, or may be of the hand-held type that is freely moveable, as shown in FIG. 3.

Figure 3:
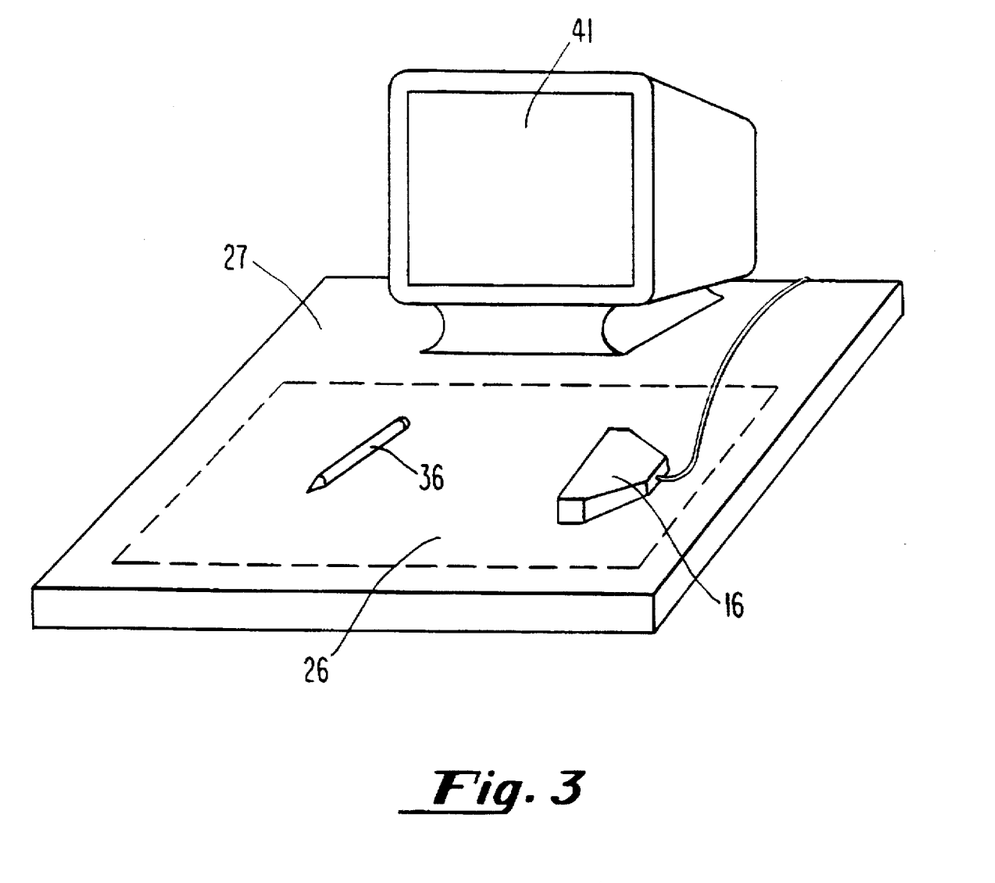
FIG. 3 is an orthogonal view of a system including a hand held scanner, x-y digitizer and computer display screen in accordance with an embodiment of the present invention.

In FIG. 3, the hand-held scanner 16 is freely moveable over the digitizer work surface 26. In this embodiment, the digitizer work surface 26 is built into the larger work surface 27. Alternatively, the digitizer work surface 26 could be provided as a mat or pad-type digitizer that rests on top of the larger work surface 27. The digitizer pen 36 is used to edit the original version of a document (not shown) that has been secured to the digitizer work surface 26 by means of mechanical fasteners, mechanical stops, adhesive tape, or the like (not shown). A computer display screen 41 is provided in order to display the electronic version of the original document, and to display any edits that are made to the document.

When a hand-held scanner is used, the digitizer pad may be used to sense the location and orientation of the scanner head whenever it is placed on the digitizer work surface. As the scanner head is passed across the secured document, the location and orientation of the scan head is known and the scanned data collected on multiple passes of the scanner head can be stitched together with redundant scanned data being discarded. In this way, a single accurate digital image of the document is produced.

The apparatus of the present invention also includes a control unit such as a microcomputer, central processing unit or the like for controlling the scanning, digitizing, storage, transmission and display functions of the system. The control unit may also control the function of correlating the position of the original and electronic documents in order to ensure that the documents correspond in scale, rotation and offset. The control unit may be provided with suitable software for carrying out the various control functions.

Other peripheral equipment such as printers, modems, drafting tools, etc. may be added to the system of the present invention.

The operation of the system of the present invention is more fully described as follows. Initially, an electronic version of a document is provided by various methods. The term "electronic" document as used in accordance with the present invention encompasses various types of machine-readable documents. In a preferred method, an original hardcopy of a document is scanned into digital form and stored by conventional bit mapping or raster techniques, as commonly used in facsimile machines. Alternatively, the electronic document may be created by vector techniques, ASCII coded character data or other conventional coding methods. Such alternative methods may be particularly suitable for documents such as, for example, engineering drawings that typically require less computer memory when provided in vector form than in bit mapped form. The electronic version of the document may initially be created by such means as word processing, computer-aided design (CAD), digital photography and the like. The initial electronic version of the document may then be printed or reproduced by other means to provide a hardcopy of the document.

A computer is preferably used to store the electronic version of the document in digital or bit mapped form. The computer is also used to store the digitized edits that are subsequently made to the original document. Preferably, the unedited electronic document is stored separately from the digitized edit in order to more easily retrieve both the edited and unedited versions of the electronic document. Furthermore, if multiple editing inputs such as different pen colors are used, it is preferred to store each of the various editing inputs separately in order to retrieve individual edits. For example, where different pen colors are used to indicate edits made by different persons, each of the different edits may be stored separately in order to retrieve the individual edits. As more fully described below, the use of different colors for edits made at different locations allows the edits made by various individuals to be separately identified.

Once the document is provided in both original and electronic form, the original version of the document is positioned in a fixed location on an x-y digitizer. The original document is fastened to the digitizer by means of mechanical clips, mechanical stops, magnetic clips, adhesive tape and the like, as discussed above. In an alternative embodiment, as shown in FIG. 3, the original document may be fastened to the x-y digitizer first, followed by scanning the document into electronic form using a moveable scanner.

After the original document has been secured to the x-y digitizer, the position of the original document is correlated with the electronic version of the document. This correlation ensures that edits made on the original document will appear at the corresponding location on the displayed image of the electronic document. Various methods may be utilized for correlating the scale, rotation and offset of the documents. In one embodiment, an original document of known size is placed on the x-y digitizer in a known rotational orientation. For example, a standard size 8.5×11 inch document may be placed squarely on an x-y digitizer pad such that the edges of the document are aligned with the x and y axes of the digitizer. In this embodiment, the corresponding scale, rotation and offset of the electronic version of the document may be established by the initial scanning operation. If the original 8.5×11 inch document is fed into the scanner with known magnification, and the document is then placed on the digitizer in a known orientation (e.g., against stops), the scale, rotation and offset of the documents can automatically be correlated. The apparatus shown in FIG. 2 may be used in this manner to both scan an original document into digital form, and to deposit the original document on an x-y digitizer in a known location such that the scale, rotation and offset of the original and electronic documents are automatically correlated. As shown in FIG. 2, the mechanical stops 22, 23 and 24 may be used to position a standard size document in a known location on the x-y digitizer.

Correlation of the position of the original and electronic documents may alternatively be accomplished by identifying at least one point on the original document and identifying the same point on the displayed image of the electronic document. In this embodiment, the scale, rotation and offset of the documents are correlated by a set-up routine that involves the location of corresponding points on the original and displayed documents. If the scale and rotation of the document are known, it is possible to identify one point on the original document and the corresponding point on the displayed version of the electronic document in order to calculate the position offset of the document on the digitizer surface. If the rotation of the document on the digitizer surface is known, as it would be for a document printed squarely on a sheet of paper and with the paper positioned against mechanical stops on the digitizer surface, it is possible to calculate the scale factors and offsets by identifying two points on the original document and the corresponding two points on the displayed image. Finally if none of the positioning parameters are known, it is possible to calculate the rotation, scale, and offset for the original document relative to the displayed document by identifying three points on the original and the corresponding three points on the displayed document. The formulas for making these calculations are given below.

The following derivations assume that the digitizer X and Y scale factors are the same, but that the display X and Y scale factors may be different. If the X an Y scale factors for the display are the same, the calculations can be simplified.

If the X and Y scale factors between the digitizer and display coordinate systems are known and there is no rotational offset between the two systems the translational offset can be computed from one point identified in both coordinate systems. If the coordinates of the identified point in the display system are XDSP1,YDSP1 and in the digitizer system are XDIG1,YDIG1 then the translational offsets are calculated by:

$$Xoffset = (XDSP1/Xscale) - XDIG1$$

$$Yoffset = (YDSP1/Yscale) - XDIG1$$

The transformation from the digitizer coordinate system to the display coordinate system can then be made using the formulas below:

$$XDSP = Xscale(XDIG + Xoffset)$$

$$YDSP = Yscale(YDIG + Yoffset)$$

If the rotational offset between the digitizer and display coordinate systems is 0 but the X and Y scale factors are not known, the transformation parameters can be calculated from two points identified in both systems. Using the same labeling conventions as above:

$$Xscale = (XDSP2 - XDSP1)/(XDIG2 - XDIG1)$$

$$Yscale = (YDSP2 - YDSP1)/(YDIG2 - YDIG1)$$

$$Xoffset = (XDSP1/Xscale) - XDIG1$$

$$Yoffset = (YDSP1/Yscale) - YDIG1$$

Figure 4:
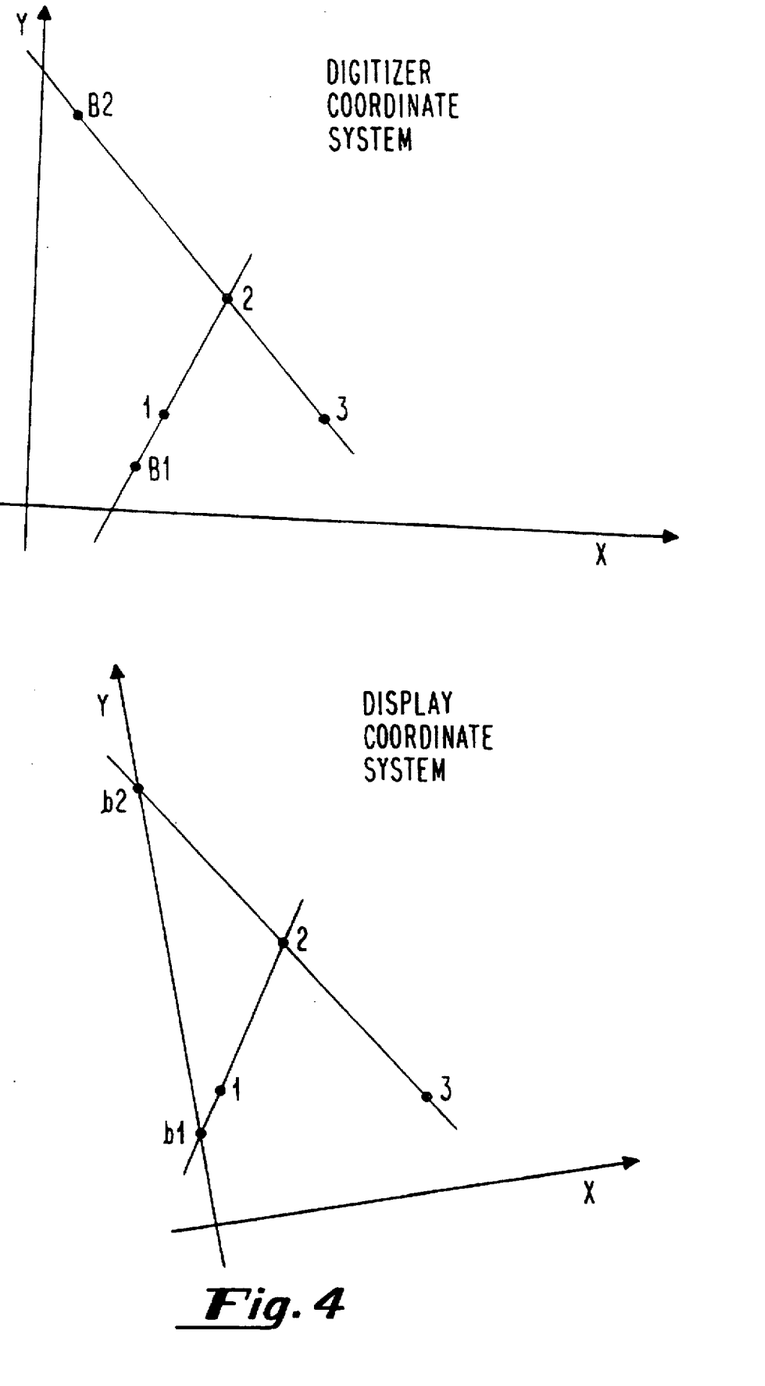
FIG. 4 is an illustration of part of a set-up routine for correlating the position of an original document to be edited with an electronic version of the document in accordance with the present invention.

If there is rotational offset between the coordinate systems and the translational offset and X and Y scale factors are unknown, three points may be identified in both systems in order to develop an accurate transformation from one coordinate system to the other. In FIG. 4 the points 1, 2, and 3 are identified in the digitizer and display coordinate systems. The Y scale is calculated by projecting the lines through points 1 and 2, and points 2 and 3 until they intercept with the Y axis of the display coordinate system at points b1 and b2 respectively. The Y coordinates of b1 and b2 can be found using the equation for a straight line:

$$y = m*x + b$$

where:

m=the slope of the line
b=the Y axis intercept

The Y coordinate of b1 calculated from the known coordinates of points 1 and 2 is therefore:

$$YDSPb1 = YDSP1 - XDSP1*(YDSP2 - YDSP1)/(XDSP2 - XDSP1)$$

The Y coordinate of b2 can be calculated similarly.

These points b1 and b2 are then mapped into the digitizer coordinate system. In the digitizer system the points corresponding to b1 and b2 are shown as B1 and B2 in FIG. 4. They are located by extending the lines in the digitizer system through points 1 and 2 and through points 2 and 3. The distance from point 1 to B1 can be calculated by using the ratios of the distances between b1 and point 1 and points 1 and 2 in the display coordinate system. The formula is given below:

$$Dist1B1 = Dist1b1 * (DistDIG12/DistDSP12)$$

where:

Dist1B1=distance from point 1 to B1 in the digitizer system
Dist1b1=distance from point 1 to b1 in the display system
DistDIG12=distance from point 1 to point 2 in the digitizer system
DistDSP12=distance from point 1 to point 2 in the display system The coordinates of the point B1 can then be calculated by:

$$XDIGB1 = XDIG1 - Dist1B1 * (XDIG2 - XDIG1)/DistDIG12$$

$$YDIGB1 = YDIG1 - Dist1B1 * (YDIG2 - YDIG1)/DistDIG12$$

where:

XDIGB1=X coordinate of B1
YDIGB1=Y coordinate of B1
XDIG1=X coordinate of point 1 in the digitizer system
YDIG1=Y coordinate of point 1 in the digitizer system
XDIG2=X coordinate of point 2 in the digitizer system
YDIG2=Y coordinate of point 2 in the digitizer system The coordinates of the point B2 can be calculated in a similar manner.

The Y scale factor can now be calculated:

$$Yscale = distance\ b1\ to\ b2/distance\ B1\ to\ B2$$

Because the points b1 and b2 both lie on the Y axis, there is no X component in the distance between them. Because the X and Y scales for the digitizer are assumed to be equal, the distance between B1 and B2 is appropriate to use in this scale factor calculation.

Figure 5:
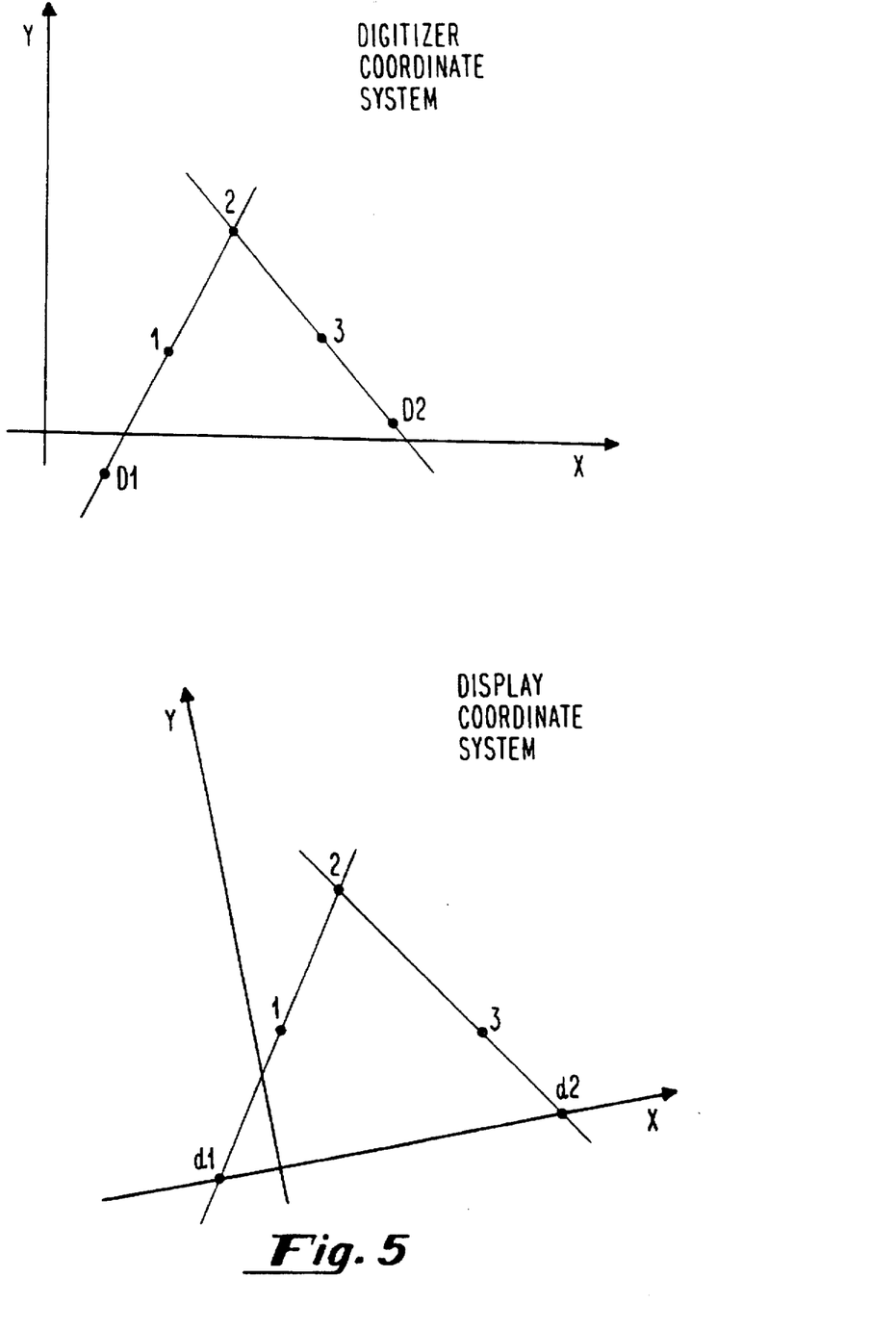
FIG. 5 is another illustration of part of a set-up routine for correlating the position of an original document to be edited with an electronic version of the document in accordance with the present invention.

The X scale factor can be calculated in a similar fashion using X axis intercepts. FIG. 5 shows the construction for these calculations. Alternatively, once the Y scale has been computed, the X scale can be obtained from any distance which is known in both the display and digitizer coordinate systems which has an X component.

The translational offsets can be found using the X and Y intercept points b1, b2, d1 and d2. Points b1 and b2 lie on the Y axis of the display coordinate system and therefore the two points B1 and B2 define the location of the display system Y axis mapped into the digitizer system. Similarly, d1 and d2 lie on the display system X axis so that D1 and D2 define the location of the display system X axis in the digitizer system. The intersection of these two lines drawn through B1,B2 and D1,D2 is therefore the origin of the display coordinate system mapped into the digitizer system. The coordinates of this intersection are therefore the translational offsets.

The rotational offset between the two coordinate systems can also be obtained from intercept points which have been mapped from the display system into the digitizer system. The sine and cosine of the angle of rotation between the coordinate systems are shown below:

$$\sin theta = (XDIGB2 - XDIGB1)/DistDIGB1B2$$

$$\cos theta = (YDIGB2 - YDIGB1)/DistDIGB1B2$$

where:

theta=angle of rotation between the two coordinate systems
DistDIGB1B2=distance between points B1 and B2

The rotational transformation is then computed using the formula:

$$YDSP = YDIG * \cos theta - XDIG * \sin theta$$

$$XDSP = XDIG * \cos theta + YDIG * \sin theta$$

When identifying corresponding points on the original and electronic documents, any suitable points may be used. For example, at least one corner of each document may be identified. Alternatively, the points may be located at various positions on each document, such as the first letter of written text, a period contained within the text, a specific object on a drawing, etc. When two or more points are to be located, it is preferred to maximize the distance between the points in order to minimize errors.

In order to perform the above-noted set-up routine for correlating the positions of the original and electronic documents, software is preferably used in a menu-driven format in which the set-up function is first selected from a menu, at least one point is identified on the original document positioned on the x-y digitizer, and at least one corresponding point is located on the displayed image of the electronic document. Points on the original document may be identified with the digitizer pen. When a point is selected on the original document using the digitizer pen, the x-y digitizer transforms that location into x-y coordinates. Points on the displayed electronic document may be identified with a cursor controlled by the same digitizer pen or other suitable device. Thus, the electronic version of the document may be displayed on a computer screen while a cursor located on the screen is moved to the same point on the electronic document as previously selected on the original document by the digitizer pen.

Once the positions of the original and electronic documents have been correlated, the original document may be edited by hand using the digitizer pen. It has been found in accordance with the present invention that operators typically prefer to make edits by marking directly on the hardcopy of a document rather than by moving a cursor over a computer screen as required in many prior art editing systems. Edits made directly on the original document are converted to digital form by the x-y digitizer. For example, where the digitizer pen comprises an inking insert and a tip switch, ink marks made on the original document are converted into digital form representing the x-y coordinates of the ink marking. The digitized edit is preferably stored in computer memory separate from the electronic version of the original document. The x-y coordinates of the digitized edit may then be combined with the corresponding x-y coordinates of the electronic version of the original document in order to provide an edited electronic document. Combination of the digitized edit and electronic version of the original document is preferably achieved by superimposing each x-y coordinate of the digitized edit on each corresponding x-y coordinate of the electronic version of the original document. Thus, for example, where a particular x-y coordinate of the electronic document is "black" and where the corresponding x-y coordinate of the digitized edit is "black", the resulting edited electronic document will be "black" at the particular x-y coordinate. As a further example, where a particular x-y coordinate of the electronic document is "black" and where the corresponding x-y coordinate of the digitized edit is "erase", the resulting edited electronic document will be erased at the particular x-y coordinate.

After the digitized edit has been added to the electronic document, the resulting edited electronic document may be displayed at at least one location. The location may be local or adjacent to the x-y digitizer such that persons editing the original document can view the corresponding edited electronic document locally on a computer display screen or the like. In addition, the edited electronic document may be displayed at locations remote from the x-y digitizer, in which case, the edited electronic document is transmitted to the remote location by telephone, computer network or any other suitable means. Where the edited document is displayed at remote locations, such locations may also be provided with an x-y digitizer that is likewise capable of editing the electronic document.

In accordance with a preferred embodiment of the present invention, a scrolling function may be provided which automatically scrolls and/or pans the electronic document to display a portion of the document that is being edited. This function is particularly useful where it is not practical to display an entire large document or where the display of the entire document would result in a loss of definition or clarity of the image. For example, if the electronic document is displayed on a computer screen, the screen may not be as large as the document. Instead of reducing the size of the document such that the entire document fits on the screen, it may be beneficial to retain or enlarge the scale of the document, and to display only a portion of the document on the computer screen. In this case, for example, the upper left hand portion of a document may originally be displayed on the computer screen. If edits are made on the upper left hand portion of the original document, there is no need to pan or scroll the displayed electronic document. However, if the digitizer pen is moved off the displayed area and is used to edit the lower right hand corner of the original document, the electronic document may be scrolled and/or panned to display the corresponding lower right hand corner of the document as it is being edited. This scrolling function is especially useful for large original documents such as engineering drawings that cannot easily be displayed in their entirety on a computer or other type of display screen. In this embodiment, the location of the digitizer pen on the x-y digitizer is used to initiate scrolling and/or panning commands that automatically cause the displayed electronic document to scroll and/or pan.

When the scrolling function is used with a system comprising multiple editing locations, such as teleconferencing systems, a trade-off function is preferably incorporated in which control of the scrolling function is exchanged between the multiple users. In this embodiment, at any given time one particular editing location controls the ability to scroll the displayed electronic document at all locations. This control can be passed to the various editing locations. For example, scrolling control may be provided to the location where hand editing on the original document is currently being performed.

In accordance with a preferred embodiment, various types of editing functions are performed with at least one digitizer pen. These various functions may include editing with multiple colors, highlighting and erasing. A single digitizer pen may be used to perform the various editing functions, in which case the operating software may include menu driven commands for selecting alternative colors, highlighters, erasers, etc. In addition, multiple digitizer pens may be used, each of which corresponds to an individual editing function. Various types of editing inputs may therefore be used at one location with at least one digitizer pen. Furthermore, for applications such as teleconferencing, operators at various remote locations can make edits that are identifiable with a given location or person. For example, editors at one location may use one color while editors at another location may use a different color. In this manner, the editing inputs from various persons and/or locations can be determined.

The system of the present invention may be provided in various forms. For example, in teleconferencing applications, the system may be provided as a complete unit including a scanner, a digitizer, a display screen, a central processing unit and software to run the various functions. Such systems may be provided at multiple locations and may communicate by telephone or computer network in order to provide document sharing capabilities for teleconferencing. Alternatively, the system may be provided as an add-on product to existing computer systems that incorporate conventional software. In this case, the system may include a scanner, digitizer and operating software that is compatible with conventional software. In this embodiment, an existing computer and display screen may be combined with the apparatus of the present invention to provide electronic document editing capabilities.

Figure 6:
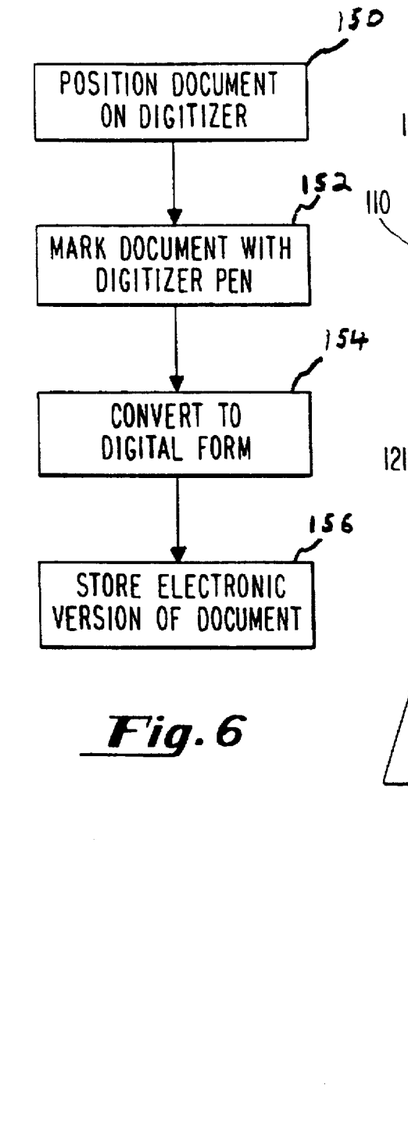
FIG. 6 is a schematic flow diagram illustrating another embodiment of the present invention.

FIG. 6 is a flow diagram in accordance with another embodiment of the present invention. As illustrated in FIG. 6, an original hard copy of the document is positioned on an x-y digitizer pad at 150. At this stage, the original document may be marked while it is secured to the x-y digitizer surface at 152. Marking is performed with a digitizer pen that, in conjunction with the digitizer surface, converts the handwritten marking into digital form at 154. The digitized marking is then stored as an electronic version of the original document at 156. This electronic document may then be later accessed for additional applications if desired.

The terms "original" and "hard copy", as indicated earlier, are used broadly to include various types of physical documents comprising paper, film, transparencies and the like. The documents may contain text, drawings and other graphical images, or alternatively may be blank without any markings at all.

The terms "mark" and "marking" are used broadly in accordance with the present invention to include various types of annotations, text, drawings and other graphical images, sketches and the like made to a document.

Typically, the original document prior to being positioned on the x-y digitizer is blank. However, the original document may also contain text, drawings and other graphical images which, prior to being positioned on the x-y digitizer, would already be provided in digital form similar to that earlier described, for example, by prior scanning of the original document or by obtaining a hard copy of a digitally created document.

The apparatus of the present embodiment preferably comprises an x-y digitizer, a support for retaining the digitizer, a digitizer pen used in conjunction with the digitizer to mark a document positioned on the digitizer, and a control unit. In addition, the apparatus may include a scanner for initially converting an original document into electronic or digital form. As indicated earlier, the x-y digitizer may be of any suitable type, such as electromagnetic, electrostatic, touch, optical, ultrasonic and the like.

Further, the digitizer pad may also optionally be provided with means for securing the document to the pad in a fixed position, similar to that earlier described. Suitable fasteners include mechanical clips such as those used on clipboards, adhesive strips and mechanical stops located at the edges and/or corners of a document.

The digitizer is preferably provided disposed within or otherwise mounted to a support of suitable construction. The support operates to both retain the digitizer and also to position the digitizer surface substantially perpendicular to the ground. Examples of suitable supports are those which are placed directly upon the ground or other substantially flat surfaces, such as a table, an easel, a stand or the like, and those which are mounted or secured to another member, such as a screen secured to a wall or to a mounting bracket secured to a wall or other fixed member.

As indicated earlier, various types of digitizer pens may be used with the x-y digitizer in the present embodiment. For instance, a preferred digitizer pen includes a tip switch that actuates when a small amount of pressure is applied to the tip of the pen. Further, the digitizer pen may be corded, but is preferably cordless in order to provide easier operation. The term "pen" as noted earlier is used in the broadest sense and includes writing instruments such as ink pens, graphite pencils, wax pencils and the like, as well as non-marking instruments. In a preferred embodiment, the digitizer pen is provided in the form of a felt tip marker for marking the hard copy of an original document.

The control unit can comprise a microcomputer, central processing unit or the like for controlling the scanning, digitizing, storage, transmission and display functions of the system as noted earlier. Further, the control unit may also control the function of correlating the position of the original and electronic documents. In addition, the control unit may be provided with suitable software for carrying out the various control functions. The interface with the control unit may be by electrical connection, or cordless in order to make installation and de-installation much simpler. For example, infra-red or spread spectrum RF communications technologies can be used for this purpose.

Other peripheral equipment such as printers, modems, drafting tools, etc. may be added where desired.

The operation of the system in accordance with present embodiment is more fully described as follows. Initially, an original document is positioned on an x-y digitizer. The original document is preferably fastened to the digitizer by means of mechanical clips, mechanical stops, magnetic clips, adhesive tapes and the like, as discussed above. In a preferred embodiment, the original document is a blank document. However, in an alternate embodiment, the original document may also contain text, drawings and other graphical images which are provide in an electronic version by the various methods earlier described prior to being secured to the x-y digitizer.

A computer is preferably used to store the digitized markings that are subsequently made to the original document using the digitizing pen. The markings that are made directly on the original document are converted to digital form by the x-y digitizer. For example, as earlier described, where the digitizer pen comprises an inking insert and a tip switch, ink marks made on the original document are converted into digital form representing the x-y coordinates of the ink marking. The digitized marking is preferably stored in a single file within the computer. Further, in instances where the original document would also contain text, drawings and/or other graphical images, an electronic version of the original document would be stored either within the same file or a file separate from the file in which the digitized markings are stored. Where the digitized markings and electronic document are provided in separate files, a resulting electronic document may be provided by combining the x-y coordinates of the digitized marking with the corresponding x-y coordinates of the electronic version of the original document in the same manner as that earlier described.

The resulting electronic document may then be utilized for a variety of different applications. For example the electronic document may be displayed at a desired location, as is discussed with relation to an earlier embodiment of the present invention. Further, the electronic document may subsequently be printed in hard copy form for circulation. In addition, the electronic document may also be edited corresponding with subsequent markings or edits of the original document and retained within the computer.

In accordance with the present embodiment, editing of the original document would be accomplished in the same manner as that described earlier. Specifically, in a preferred method, the original version of the document to be edited is positioned on the x-y digitizer via the particular fastening means discussed above. After the original document has been secured to the x-y digitizer, the position of the original document is correlated with the electronic version of the document stored within the computer. The manner of correlating the original document with the electronic version of the original document is the same to that earlier described, and for the sake of brevity is not more fully described herein. In a preferred embodiment, the original and electronic documents may be mechanically correlated through placement of the original document in known position on the xy digitizer via the fastening means discussed above. Once the positions of the original and electronic documents have been correlated, the original document may then be edited by hand using the digitizer pen. The edits made directly on the original document are then converted into digital form by the x-y digitizer. Preferably the digitized edit is stored in computer memory within the same file as the electronic version of the original document, and combined in the same manner as that earlier described which provides an edited electronic version of the original document. However, the digitized edit may also be stored in computer memory separate from the electronic version of the original document, and then subsequently combined to form the edited electronic version of the original document. The edited electronic version of the original document may then be utilized for further processing in the same manner described above.

Figure 7:
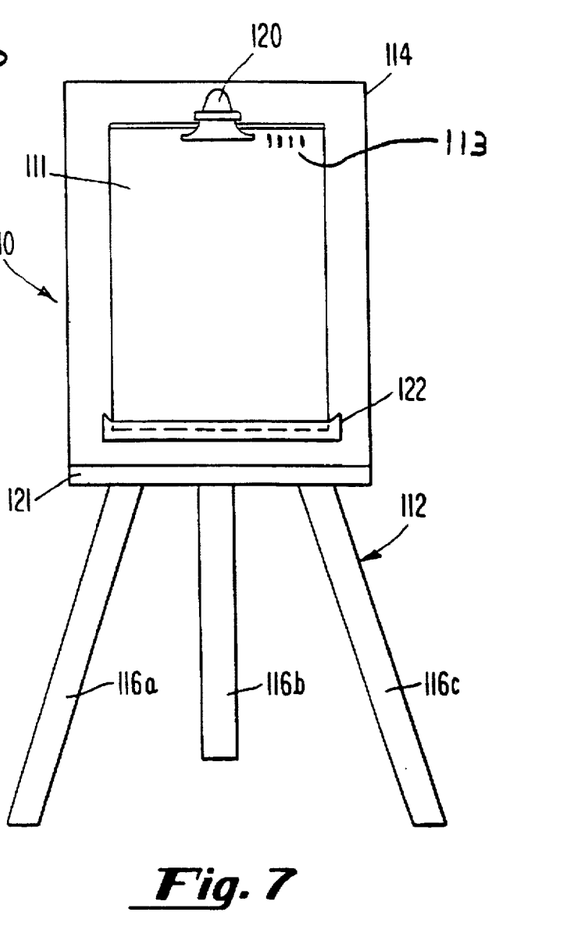
FIG. 7 is a front elevational view of a digitizer apparatus in accordance with an embodiment of the present invention.

In FIG. 7 is illustrated a front elevational view of a preferred apparatus in accordance with the present embodiment. In FIG. 7, the apparatus 110 includes a support 112 and a digitizer board 114 mounted to the support 112. A more detailed view of the configuration of the support 112 and digitizer board 114 is best seen in the side elevational view of FIG. 8. In this embodiment, preferably the support 112 comprises an easel of a suitable material, such as plastic, metal, wood or the like. The easel 112 is comprised of three generally elongated leg members 116a-116c which are connected to each other at one end and diverge outwardly in the direction of the terminating ends. Further, preferably a pair of reinforcing members 118 are also provided connected between the legs 116c and 116b and between legs 116a and 116b (not visible) in order to reinforce the structure of the easel 112. In addition, the legs 116a-116c can also be made pivotal to one another in order to facilitate installation and de-installation of the device. For instance, the legs 116a and 116c being pivotal in relation to the leg 116b and the reinforcing members 118 being pivotal proximate the center thereof to correspond with the pivotal movements of the legs 116a-116c. The connections between the legs 116a-116c and reinforcing members 118 can be by any suitable fastening mechanism, such as screws, rivets or the like.

Figure 8:
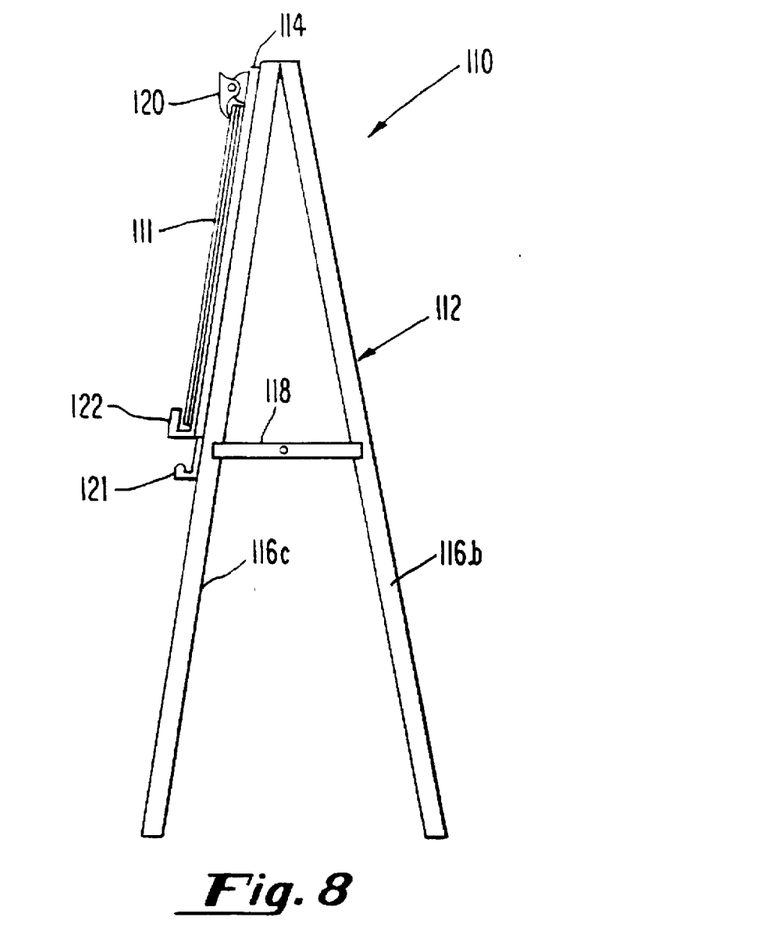
FIG. 8 is a right side elevational view of the digitizer apparatus of FIG. 7.

As best seen in FIG. 7, the digitizer board 114 is provided mounted to the easel 112 against the legs 116a and 116c. Mounting of the digitizer board 114 can be accomplished using any suitable coupling mechanism, such as an adhesive, velcro strips, screws, rivets or the like. Further, preferably mounted to the digitizer board 114 are mechanical stops 120 and 122 which secure the document against the digitizer board 114. As seen in FIGS. 7 and 8, in the present embodiment, the mechanical stop 122 is a generally elongated L-shaped member extending proximate the bottom of the digitizer board 114. Further, in the present embodiment the mechanical stop 120 comprises a clip attached proximate the upper end of the digitizer board 114. In other embodiments, different types and numbers of mechanical stops can be provided for this same purpose. The document 111 may then be placed on the digitizer board 114 by positioning the lower edge of the document within the L-shaped stop 122 and the top edge of the document within the clip 120. In the present embodiment, the document 111 is a conventional flip-chart comprising a pad or tablet of paper of a defined number of sheets secured at the upper end, with each sheet defining a separate document. As best seen in FIG. 7, preferably the digitizer board 114 is sized larger than the size of the document positioned by the mechanical stops 120 and 122. Further, as best illustrated in FIG. 8, in this embodiment a pencil tray 121 may also be provided which is generally L-shaped and attached to the easel via the legs 116a, 116c by screws, rivets, adhesive or the like.

Figure 9:
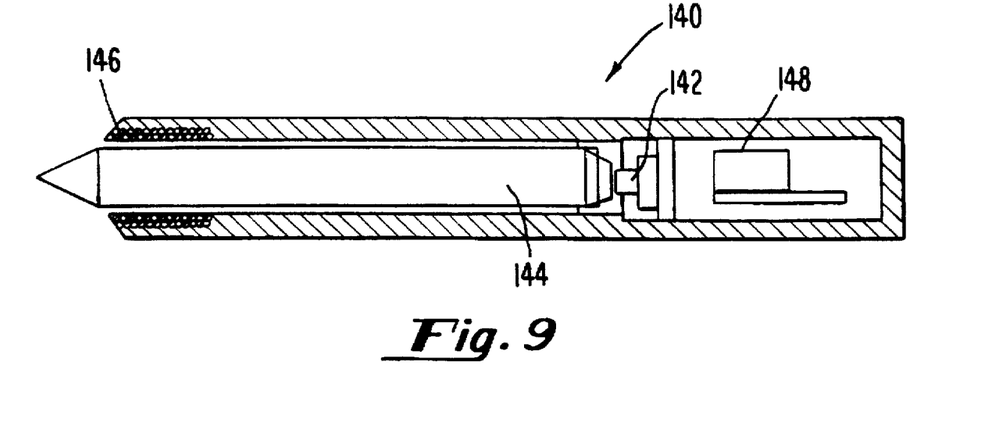
FIG. 9 is a sectional elevational view of one embodiment of a digitizer pen in accordance with the present invention.

The apparatus of the present embodiment also includes a digitizer pen which is adapted to mark directly on the document while also operating with the digitizer board 114 to provide a digitized representation of the marking provided on the document. In FIG. 9 is illustrated one embodiment of a digitizer pen in accordance with the present embodiment. The digitizing pen 140 as shown includes a tip switch 142 which, as indicated earlier, actuates when a small amount of pressure is applied to the tip of the pen corresponding to when a marking is applied to the document. The digitizing pen 140 also includes a removable felt tipped marker insert 144 which actuates the tip switch when applied to the document surface. The remaining components of the digitizing pen 140 includes a conventional digitizer pen position sensing mechanism including a coil 146 which is disposed within a tuned circuit driven at a predetermined frequency. In this embodiment, the digitizer pen 140 is of the cordless type including a battery 148 proximate its distal end. However, in addition to the digitizer pen 140 as illustrated in FIG. 9, it should be understood that other various types of digitizer pens may also be used in the present embodiment, such as the types earlier described.

The operation of the system in accordance with the present preferred apparatus is more fully described as follows. The paper pad 111 is positioned on the surface of the digitizer board 114 via the mechanical stops 120 and 122. In particular, the bottom of the paper pad 111 is received within the L-shaped stop 122 and the clip 120 is used to secure the top of the paper pad 111.

After the paper pad 111 has been secured to the digitizer board 114, the paper pad 111 may be subsequently marked through use of the digitizer pen 140. In this manner, as the digitizing pen 140, with its felt tip marker insert 144, is used to write on the paper pad 111, the position of the digitizer pen 140 can be sensed by the digitizer board 114. In accordance with the present embodiment, the pen position sensing mechanism must be capable of operating at a distance from the digitizer board 114 which is at least as great as the thickness of the paper pad 111. In particular, as earlier described, the paper pad 111 preferably comprises a variable number of sheets of paper. The digitized marking information is then sent to the computer where appropriate software can save the graphical image of the particular marking written on the paper pad 111. As indicated earlier, the interface between the device 110 and the computer can be provided either over an electrical connection or via a wireless interface. In this embodiment, preferably the information is stored in one file within the computer. Further, preferably when a sheet of paper of the paper pad 111 is filled and subsequently torn off, the software is notified to start a new file in order to receive the information marked on the next sheet of paper on the paper pad 111. In this manner, each particular page of the paper pad 111 is separately retained within the computer.

Further, the present preferred apparatus of the present embodiment may also be utilized for editing of the original document. Initially, the particular sheet of paper from the paper pad 111 which is desired to be edited is placed on the digitizer board surface 114 and placed within the mechanical stops 120 and 122. The software is then notified in order to reload the particular file in computer memory which contains the electronic version of the particular sheet desired to be edited. In addition, the position of the original document is correlated with the electronic version of the document stored within computer memory. This correlation insures that the edits made on the original document will appear at the corresponding location in the computer file. Correlation is accomplished in the same manner discussed in detail earlier in this application.

Once the positions of the original and electronic documents have been correlated, the original document may be edited by hand using the digitizer pen 140. The edits made directly on the original document are converted to digital form by the digitizer board 114. The digitized edit is preferably combined with the electronic version of the original document in order to provide an edited electronic version of the original document and then stored in the same file. However, the digitized edit can also be stored in computer memory separate from the electronic version of the original document and then subsequently combined in order to provide the edited electronic document. The combination of the digitized edit and the electronic version of the original document is achieved in the same manner as that described earlier.

Although not shown, several enhancements to the system described above can also be provided, which are discussed more fully below.

In one embodiment, the mechanical stops and clips 120 and 122 can be adapted in order to secure the original document in a known location on the surface of the digitizer board. An advantage is that the original document when placed back on the digitizer board for editing can be mechanically positioned exactly as it had been originally. As discussed earlier, in this manner, the scale, rotation and offsets of the original and electronic documents are automatically correlated.

In another embodiment, means for identifying a document is also provided. One advantage of such identifying means is that a particular page which is to be edited can be identified. Preferably, for this purpose a particular coding scheme is provided incorporated within the pages of the paper pad in predetermined locations. For instance, the coding scheme can be a bar code 113 such as shown in FIG. 7 or simple dot position coding scheme which is pre-printed or otherwise attached to the respective pages of the paper pad. In this manner, each one of the pages of the paper pad would include a unique code associated with that particular document.

In one variation, an optical reader or the like is provided which is adapted to read the codes when the pages are mounted on the digitizer board. The position of the codes on the documents are dependent upon the location of the optical reader in relation to the digitizer board. For instance, in FIG. 7 the optical reader can be mounted within the mechanical stop 122 adjacent one end thereof, and the coding scheme would be provided adjacent the corresponding corner of the documents. For example, where the optical reader would be provided adjacent the left end of the mechanical stop 122 shown in FIG. 7, the coding schemes would be provided adjacent the lower left and corner of the documents. In operation, when starting a fresh page, the optical reader would read the coding scheme on the page and attach it as a page identifier to the computer file. The interface between the optical reader and the computer would either be wireless or via electrical connections similar to the digitizer board. Thereafter, when the page is again put back on the digitizer board for editing, the code can again be read, and the proper computer file reloaded.

In another variation, the digitizer pen is utilized in order to identify the particular codes of the documents rather than an optical reader. In this manner, when a fresh page is started, the code is touched with the digitizer pen and that page identifier is then attached to the computer file associated with that original document. Thereafter, when the page is remounted on the digitizer board, the code is again touched with the pen, and the proper file then is identified and reloaded for editing.

Another variation for identifying a particular document incorporates a conventional thickness measurement gage preferably mounted to the device. For instance, the gage, can be provided within the mechanical stop 122 illustrated in FIG. 7. In this manner, the bottom of the pad of paper would be received within the gage, with the gage then measuring the pad thickness in determining which page is the front page of the paper pad. In order to accomplish this operation, the gage would need to be able to operate with an accuracy corresponding to the thickness of one sheet of paper. A typical sheet of conventional flip chart paper is approximately 0.005 inches thick. Measurement mechanisms capable of operating within these parameters are readily available.

The following is one illustrative example of the operation incorporating the foregoing measuring gage. In this example, the paper pad is comprised of 10 sheets, with the total thickness of the flip chart being approximately 0.05 inches thick. Starting with page 1, page 1 would correspond with a measurement of 0.05 inches, page 2 corresponding with a measurement of 0.45 inches, page 3 corresponding with a measurement of 0.04 inches up to page 10 which would correspond with a measurement of 0.005 inches. Further, this counting scheme can also be reversed in that page 1 would be designated corresponding to a measurement of 0.005 inches and page 10 corresponding with a measurement of 0.05 inches. Similarly, other counting schemes are also possible.

In another embodiment, means are provided for detecting when a document is replaced with another document. In accordance with this embodiment, one particular variation includes means for detecting when pages are advanced in order to notify the computer when to advance the particular file. For this purpose, preferably a finger with an elastomeric or plastic tip is provided which is mounted in the device in order to engage the bottom edge of the pad of paper. The finger when mounted is preferably spring loaded for movement both upward and downward and is coupled to a switch in order to sense the respective upward and downward movements. For instance, the finger can be mounted within the bottom of the mechanical stop 122 shown in FIG. 8 for this purpose. In operation, when a page is changed, it would be pulled upward out of the mechanical stop 122, thus moving the finger upward in that direction and activating the switch. The switch closure is sensed by the electronics of the device and is communicated to the computer where the software will advance the electronic document to a new page, corresponding to the new page advanced on the flip chart itself. An advantage of this particular embodiment is that the computer will automatically advance to a new page on the flip chart whenever a document is removed.

Another variation in this particular embodiment provides means for detecting when a page is inserted back into the page holder, for instance the mechanical stop 122 shown in FIG. 7. For this purpose, the apparatus for detecting the page advance described above would be revised to include a second switch which would be adapted to detect motion of the finger in a downward direction corresponding to when a page is forced back into the mechanical stop 122. Advantageously, this would provide a method for detecting when the last page is put back onto the flip chart. In this manner, the computer would automatically recall the electronic document associated with the previous page, so that any further editing of the original page on the flip chart will be added to the proper electronic page in the computer file.

Alternatively, another embodiment for sensing when a page is inserted back into the mechanical stop can include a clip mechanism which is secured to the digitizer board surface. For instance, a clip mechanism can be provided in place of the stop mechanism 122 shown in FIG. 7. A conventional clip used on a clip board can be utilized for this purpose. In addition, the clip is also provided with a spring loaded finger similar to that described above and also a switch which would be adapted to activate when the clip was opened. In this manner, when a previous page would be put back into the flip chart, the clip would be opened in order to place the page in position, which would be detected by the switch and accordingly communicated to the computer so that the previous electronic document could be recalled.

In still another embodiment, means can also be provided in order to display the current electronic page active in the computer in order for the user to verify that the electronic page corresponds to the original page on the flip chart. For this purpose, a one or two digit display can be provided mounted to or provided within the device itself.

Another embodiment includes the addition of hand written character recognition software in order to convert the hand written marking provided on the original page into text. A number of commercially available software packages can be utilized for this purpose. Such software packages can recognize and convert to text the graphics of hand lettered characters. One type of software package makes use of the sequence of the strokes used to generate the letters as well as the final graphical image of the letter in converting the hand lettered characters to text. This converted data is then available for further purposes, such as for general distribution or for further editing using conventional text editing software.

It is to be understood that the above description of the present invention is susceptible to various modifications, changes and adaptations by those skilled in the art, and that such modifications, changes and adaptations are to be considered within the spirit and scope of the invention, as set forth by the claims which follow. For instance, it should be understood that the features disclosed in relation to any one of the embodiments of the present invention can also have application with, or otherwise be incorporated within, the remaining embodiments as well. Furthermore, it should be understood that each of the particular features disclosed in relation to any one embodiment of the present invention all do not need to be present in that embodiment in order to be considered within the scope and spirit of the present invention.

What is claimed is:

1. A system for processing documents comprising:
   a support means for receiving relative to a substantially horizontal plane at least one document in a position having a longitudinal axis of said document being closer to an axis perpendicular to said horizontal plane than to an axis parallel to said horizontal plane;
   means for marking on said at least one document;
   means responsive to said marking means for converting said marking provided on said document into electronic form; and
   means for storing said electronic form of said marking as an electronic version of said document.

2. A system according to claim 1, further comprising means for detecting when said document is replaced with at least a second document, wherein said detecting means comprises a switch and activating means cooperatively associated with said switch, said activating means further including contact means adapted for engaging said document, with said activating means activating said switch as said contact means is displaced relative to displacement of said document.

3. A system according to claim 1, further comprising means for displaying a page designation corresponding to said document.

4. A system according to claim 1, further comprising means for identifying said document.

5. A system according to claim 4, wherein said identifying means comprises a code on said document, means for reading said code, and means operatively associated with said reading means for storing said code corresponding to said document.

6. A system according to claim 4, wherein said identifying means comprises gage means for measuring a width of said document, whereby said identification of said document corresponds to a predetermined width measured by said gage means.

7. A system according to claim 1 further comprising:
   means for correlating the position of the document with the electronic version of said document;
   means for editing said marking on said document;
   means responsive to said edit made to said marking for converting said edit provided on said document into electronic form; and
   means for storing said electronic form of said edit and said electronic version of said document as an edited electronic version of said document.

8. A system according to claim 7, wherein said means for marking on said at least one document and means for editing said marking on said document comprises a digitizer pen including a mechanism for marking the document.

9. A system according to claim 7, wherein said means for storing said electronic form of said marking as an electronic version of said document and said means for storing said electronic form of said edit as an edited electronic version of said document comprises a computer.

10. A system according to claim 9, wherein said electronic version of said document and edited electronic version of said document are stored in one file.

11. A system according to claim 1, wherein said means responsive to said marking means for converting said marking provided on said document into electronic form comprises a digitizer, said digitizer having a substantially planar surface for receiving said document, wherein an axis defined by said substantially planar surface is substantially perpendicular to said horizontal plane, whereby said horizontal plane is substantially parallel to a portion of ground at least adjacent said support means.

12. A system according to claim 11, wherein said means responsive to said edit made to said marking for converting said edit provided on said document into electronic form comprises a digitizer.

13. A system according to claim 12, further comprising means for positioning said document in a predetermined location relative to said digitizer.

14. A system according to claim 11, wherein said support means includes means for retaining said document on said substantially planar surface of said digitizer.

15. An apparatus according to claim 14, wherein said retaining means includes at least one substantially L-shaped stop connected with and extending from said substantially planar surface proximate a bottom end of said digitizer.

16. A system according to claim 15, wherein said retaining means further includes at least one clip connected with and extending from said substantially planar surface proximate an upper end of said digitizer.

17. An apparatus for processing documents comprising:
   a digitizer board having a substantially planar surface for receiving a document;
   means for supporting said digitizer board relative to a substantially horizontal plane so that an axis defined by said substantially planar surface is positioned closer to an axis perpendicular to said horizontal plane than to an axis parallel to said horizontal plane;
   a digitizer pen including means for marking said document;
   said digitizer being responsive to said digitizer pen for converting said marking as provided on said document into digital form; and
   a computer for storing said digital form of said marking provided on said document in a file.

18. An apparatus according to claim 17, wherein said documents define a pad of paper of a defined number of sheets and said document comprises one sheet from said pad of paper.

19. An apparatus according to claim 17, wherein said support means comprises means for positioning said apparatus on a surface, said support means further comprising means for connecting said digitizer board and said positioning means so that said axis defined by said substantially planar surface of said digitizer board is substantially perpendicular to said horizontal plane, whereby said horizontal plane is substantially parallel to a portion of ground adjacent said apparatus.

20. An apparatus according to claim 19, wherein said positioning means comprises an easel having a plurality of elongate legs and said connecting means includes at least two of said elongate legs for supporting said digitizer board on said easel.

21. An apparatus according to claim 17 further comprising means for retaining said document on said substantially planar surface of said digitizer board.

22. An apparatus according to claim 21, wherein said retaining means includes at least one substantially L-shaped stop connected with and extending from said substantially planar surface proximate a bottom end of said digitizer board.

23. An apparatus according to claim 22, wherein said retaining means further includes at least one clip connected with and extending from said substantially planar surface proximate an upper end of said digitizer board.

24. A method for processing documents comprising the steps of:
   a) positioning a document on a digitizer coupled to a support so that a longitudinal axis of said document is closer to an axis perpendicular to a portion of ground than to an axis parallel to said portion of ground;
   b) marking said document;
   c) digitizing the marking made to said document; and
   d) storing said digitized marking made to the document to provide an electric version of said document in a file.

25. A method according to claim 24 further comprising the steps of:
   a) positioning said document on said digitizer;
   b) correlating the position of the document with the electronic version of said document;
   c) editing said document;
   d) digitizing the edit made to said document; and
   e) storing said digitized edit made to said document and the electronic version of said document as an edited electronic version of said document in said file.

26. A method according to claim 25, further comprising the steps of:
   detecting when said document is removed; and
   providing a second file for a second document.

27. A method according to claim 26, further comprising the steps of:
   reading a code on said document; and
   attaching said code as a page identifier to said file.

28. A method according to claim 26, further comprising steps of:
   reading a code on said document; and
   accessing said file corresponding to said code.

29. A method according to claim 25 further comprising the step of:
   detecting when said document is replaced with a second document.

30. A method according to claim 29, wherein said documents define a pad of paper of a defined number of sequentially arranged sheets.

31. A method according to claim 30 further comprising steps of:
   detecting when said sheets of said pad of paper are advanced to a new sheet;
   accessing a new file each time said pad of paper is advanced.

32. A method according to claim 30, further comprising steps of:
   detecting when said sheets of said pad of paper are returned to an old sheet;
   accessing an old file corresponding to said old sheet.

33. A method according to claim 30 further comprising the steps of:
   detecting a width of said pad of paper;
   accessing a file associated with a particular sheet corresponding to a measured width of said pad of paper.

* * * * *

UNITED STATES PATENT AND TRADEMARK OFFICE
CERTIFICATE OF CORRECTION

PATENT NO. : 5,737,740
DATED : April 7, 1998
INVENTOR(S) : Phillip L. Henderson and David J. Porter It is certified that error appears in the above-identified patent and that said Letters Patent is hereby corrected as shown below:

Col. 18, line 37 "0.45" should be deleted and insert therefore --0.045--.

Signed and Sealed this

Thirtieth Day of June, 1998

Attest:

BRUCE LEHMAN

*Attesting Officer*  *Commissioner of Patents and Trademarks*